United States Patent [19]
Lenk et al.

[11] Patent Number: 5,844,440
[45] Date of Patent: Dec. 1, 1998

[54] CIRCUIT FOR INRUSH AND CURRENT LIMITING

[75] Inventors: Ronald J. Lenk, Sunnyvale; Dan Lee Todd, Union City, both of Calif.

[73] Assignee: Ericsson, Inc., Menlo Park, Calif.

[21] Appl. No.: 771,439

[22] Filed: Dec. 20, 1996

[51] Int. Cl.⁶ ..................................................... H03K 5/08
[52] U.S. Cl. ........................... 327/322; 327/77; 327/110; 327/387; 327/427
[58] Field of Search ................................ 327/63, 65, 67, 327/68, 72, 73, 77, 89, 110, 387, 388, 427, 322

[56] References Cited

U.S. PATENT DOCUMENTS

| | | | |
|---|---|---|---|
| 4,873,453 | 10/1989 | Schmerda et al. | 307/130 |
| 5,475,332 | 12/1995 | Ishimoto | 327/77 |
| 5,602,500 | 2/1997 | Fournel | 327/77 |

*Primary Examiner*—Timothy P. Callahan
*Assistant Examiner*—Jeffrey Zweizig
*Attorney, Agent, or Firm*—Lyon & Lyon LLP

[57] ABSTRACT

A circuit for limiting the current flow in a "pluggable" circuit during start-up or circuit fault conditions employs a MOSFET in conjunction with a feedback system, wherein a source terminal of the MOSFET is connected to a power supply bus and a drain terminal of the MOSFET is connected to the circuit to be current limited, respectively. A gate terminal of the MOSFET is controlled by a pair of op amps, wherein the first op amp amplifies the voltage across a current sensing resistor between the MOSFET and the circuit and outputs this pre-amplified voltage into the second op amp, and the second op amp amplifies the difference between this pre-amplified voltage and a first reference voltage. The output of the second op amp is connected to the gate terminal of the MOSFET, thereby varying the voltage at the gate terminal, as the output of the second op amp varies. A comparator may be provided to turn the MOSFET completely OFF during a circuit fault, wherein an output of the comparator is connected to the input of the second op amp. During a circuit fault, a comparator produces a high voltage at its output when a transient voltage across an RC circuit rises above a second reference voltage, thereby latching the second operational amplifier high and turning OFF the MOSFET.

20 Claims, 3 Drawing Sheets

CIRCUIT FOR INRUSH AND CURRENT LIMITING

FIELD OF THE INVENTION

The present invention pertains to the field of circuits used for inrush current limiting.

BACKGROUND OF THE INVENTION

Almost any circuit that is plugged into a live power system will require some type of inrush current limiting. This is because power supply bypass capacitors in the circuit will attempt to charge up very rapidly when suddenly attached to a supply voltage, creating a high current flow within the circuit. As a result, various electrical contacts in the circuit may be damaged due to arcing, or the supply voltage may be pulled down, thereby interrupting operation of any additional circuitry connected to the same power supply. Further, an almost universal requirement for "pluggable circuits," whether into live power systems or not, is that they should be fault current limited. In other words, if a fault occurs, either in the particular circuit or in a load attached to that circuit, the input current to the circuit must be limited in order to prevent the possibility of a fire occurring due to excessive power dissipation.

Many solutions to the problems posed by current limiting have been advocated. A common solution has been to insert a current limiting resistor in series between the power supply bus and the circuit. This approach has its drawbacks, however. First, power is dissipated in the current limiting resistor, even during normal operation, thereby causing excess heat dissipation and reduced circuit efficiency. Second, the current limiting resistor has two contradictory requirements. During normal operation, there must be a low voltage drop across the resistor, so that the supply bus voltage remains in regulation. Yet, during start-up or if a fault occurs, there must be a high voltage drop across the resistor, resulting in high power dissipation.

More sophisticated techniques involve placing a MOSFET in series between the power bus and the circuit. The gate of the MOSFET is controlled, for example, by an RC circuit, which turns the MOSFET ON slowly during start-up, allowing the power supply bypass capacitors in the circuit to charge slowly. During normal operation, the MOSFET in combination with the RC circuit presents a low voltage drop. Known MOSFET based current limiters, however, still suffer from one or more problems.

For example, a MOSFET based current limiter does not protect the circuitry and power supply from faults, since a considerable time will elapse before the MOSFET will turn off. In particular, known MOSFET based circuits are too slow, acting typically in milliseconds, rather than in microseconds. A hard short for as little duration as 100 μsec is enough to pull down a supply bus. Also, known MOSFET based current limiters will not work if there is "insertion bounce;" i.e., where the circuit makes contact with a power supply bus, bounces away, and then recontacts the bus. During the second contact, the limiter will already have acted and will not be reset.

Known MOSFET based current limiters also require relatively large power components to prevent the limiter from overheating during a fault, thereby making the limiter large and unsuitable for integration into many types of circuits. Moreover, the current limit value of known MOSFET based current limiters is imprecise, requiring a considerable margin for tolerance in both the circuit and the power supply. Finally, because known MOSFET based current limiters require an additional power supply to work, sequencing problems are presented to the circuit designer.

Thus, it is desirable to provide a MOSFET based current limiter that can be efficiently used to limit the current surge during start-up or faults, without experiencing the aforementioned problems of prior art current limiters.

SUMMARY OF THE INVENTION

The present invention provides a limiting circuit employing a MOSFET in conjunction with a feedback system for limiting the current flow in a "pluggable" circuit during start-up or circuit fault conditions.

In a preferred embodiment, the circuit to be limited is connected to a positive voltage power supply bus via a P-channel MOSFET, wherein a source terminal of the MOSFET is connected to the power supply bus, and a drain terminal of the MOSFET is connected to the circuit, respectively. In accordance with a first aspect of the present invention, a gate terminal of the MOSFET is controlled by a feedback circuit comprising a pair of operational amplifiers ("op amps"), wherein the first op amp amplifies the voltage across a current sensing resistor between the MOSFET and the circuit and outputs this pre-amplified voltage into the second op amp, and the second op amp amplifies the difference between this pre-amplified voltage and a first reference voltage. The output of the second op amp is connected to the gate terminal of the MOSFET, thereby varying the voltage at the gate terminal, as the output of the second op amp varies.

During start-up (i.e., during the charging of the circuit capacitors after the circuit is plugged into the power supply bus) or during a circuit fault, a high current (but limited, as explained herein) will flow into the circuit. During this period, the pre-amplified voltage at the input of the second op amp will be higher than the first reference voltage, thereby causing the second op amp to amplify the difference between this pre-amplified voltage and the first reference voltage. The increase in voltage at an output of the second op amp causes the voltage at the gate terminal of the MOSFET to increase, thereby decreasing the current flowing through the MOSFET. In this manner, the current limiter limits the current flowing into the circuit to a specific level during start-up and circuit faults.

During normal operation of the circuit (i.e., after the circuit capacitors are charged), current flowing into the circuit will equal or be smaller than the rated current. During this period, the pre-amplified voltage at the input of the second op amp will be lower than the first reference voltage, thereby causing the second op amp to go to ground. As a result, the current limiter does not limit the current flowing into the circuit during normal operation.

In accordance with another aspect of the present invention, a comparator is provided to turn the MOSFET completely OFF during a circuit fault. The output of the comparator is connected to the input of the second op amp. The comparator will output a high voltage into the second op amp when a transient voltage across a RC circuit rises above a second reference voltage. In operation, as the high current flowing into the circuit causes the second op amp to output a voltage to the gate terminal of the MOSFET, the RC circuit charges. Eventually, the voltage across the RC circuit will rise above the second reference voltage, thereby causing the comparator to latch the second op amp high and turning OFF the MOSFET until the power supply bus is recycled. The time constant of the RC circuit is preferably set so that the comparator does not falsely latch the second op amp during start-up and circuit load transients.

In selected preferred embodiments, an enable, such as a BJT transistor may be placed between the power bus and the gate terminal of the MOSFET so that the MOSFET can be manually turned OFF by inputting a signal into the BJT transistor.

If the preferred current limiting circuit is used in conjunction with a negative voltage power supply bus, an N-channel MOSFET 76 is used instead of the P-channel MOSFET, and the respective input polarities of the first and seconds op amps and the comparator, respectively, are reversed.

As will be apparent to those skilled in the art, other and further objects and advantages will appear hereinafter.

BRIEF DESCRIPTION OF THE DRAWINGS

The drawings illustrate both the design and utility of preferred embodiments of the present invention, in which.

DETAILED DESCRIPTION OF THE PREFERRED EMBODIMENTS

Figure 1:
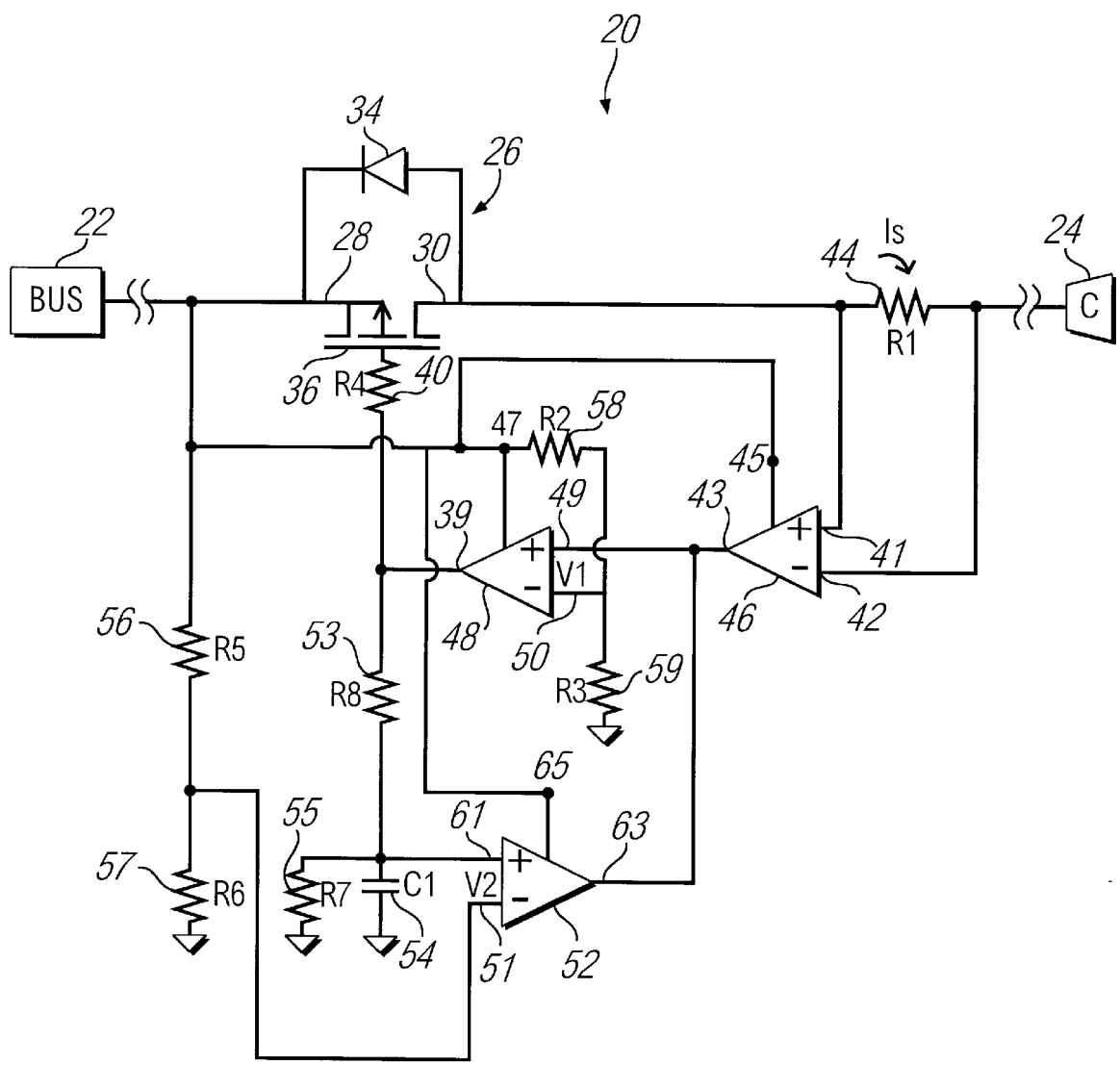
FIG. 1 is a schematic diagram of a preferred embodiment of a current limiting circuit for use with a positive voltage power supply bus in accordance with the present invention.

Referring to FIG. 1, a current limiting circuit 20 is connected between a positive voltage power supply bus 22 and a circuit 24 in which the current flow is to be limited. The current limiting circuit 20 comprises a P-channel MOSFET 26, which serves to vary the electrical current from power supply bus 22 into the circuit 24 during start-up and faults. The MOSFET 26 comprises a characteristic MOSFET body diode 34, a source terminal 28, a drain terminal 30, and a gate terminal 36, respectively. The source terminal 28 is connected to the power bus 22, and the drain terminal 30 is connected to the input of circuit 24, via a current sensing resistor 44 having a selected resistance value R1. In particular, resistor 44 serves to sense the current $I_s$ between the MOSFET drain terminal 30 and the circuit 24. In a currently preferred embodiment, the resistance value R1 is preferably selected to be in the ten's of mΩ's, so that resistor 44 dissipates a minimal amount of power.

In accordance with a general aspect of the invention, a pair of operational amplifiers ("op amps") 46 and 48 serve to provide feedback of the current $I_s$ to the MOSFET 26 during start-up or faults, so that the MOSFET 26 will maintain the current flowing into circuit 24 at no more than a maximum desired (i.e., safe) level. In particular, a positive input terminal 41 of the first op amp 46 is connected to the drain terminal 30 of MOSFET 26 (i.e., prior to resistor 44), and a negative input terminal 42 of the first op amp 46 is connected to the input of circuit 24 (i.e., past resistor 44), respectively. A power terminal 45 of the first op amp 46 is connected to the power bus 22. In this manner, the first op amp 46 acts to amplify the voltage across resistor 44 and is powered as soon as the bus 22 is present.

An output 43 of the first op amp 46 is connected to a positive input terminal 49 of the second op amp 48. A power terminal 47 of second op amp 48 is connected to the power bus 22. A first offset resistor 58 having a selected resistance value R2 is connected between a negative input terminal 50 of the second op amp 48 and the power bus 22, and a second offset resistor 59 having a selected resistance value R3 is connected between the negative input terminal 50 and ground. As can be seen, the first and second offset resistors 58 and 59, respectively, serve to offset the negative input terminal 50 by an offset voltage V1, where V1=(voltage rating of power bus 22)*R3/(R2+R3), with the selected values of R2 and R3 being an obvious design choice to one skilled in the art. In this manner, the second op amp 48 serves to amplify the difference between the voltage at the output 43 of the first op amp 46 and the offset voltage V1 at the negative input terminal 50 of the second op amp 48.

A gate limiting resistor 40 having a selected resistance value R4 is connected between the output 39 of second op amp 48 and the gate terminal 36 of MOSFET 26, wherein selection of the resistance value R4 will be an obvious design choice to one skilled in the art. As can be seen, the voltage at the gate terminal 36 thereby increases as the voltage at the output 39 of second op amp 48 increases.

In accordance with another general aspect of the invention, a comparator 52 serves to turn the MOSFET 26 OFF during faults, by way of the second op amp 48. In particular, a third offset resistor 56 having a selected resistance value R5 is connected between a negative input terminal 51 of comparator 52 and the power bus 22, and a fourth offset resistor 57 having a selected resistance value R6 is connected between the negative input terminal 51 and ground, respectively. In this manner, third and fourth offset resistors 56 and 57, respectively, serve to offset the negative input terminal 51 by an offset voltage V2, where V2= (voltage rating of power bus 22)*R6/(R5+R6), with the selection of the resistance values R5 and R6 being an obvious design choice to one skilled in the art. A resistor 53 having a selected resistance value R8 is connected between a positive input terminal 61 of comparator 52 and the output 39 of the second op amp 48, and a resistor 55 having a selected resistance value R7 is connected between the positive input terminal 61 and ground. An output 63 of the comparator 52 is connected to the positive input terminal 49 of the second op amp 48. A power terminal 65 of comparator 52 is connected to the power bus 22. As can be seen, comparator 52 constantly applies a high voltage to the positive input terminal 49 of the second op amp 48, once the voltage across resistor 55 is greater than the offset voltage V2 at the negative input terminal 51 of comparator 52. A capacitor 54 having a selected capacitance value C1 is connected between the positive input terminal 61 of comparator 52 and ground. In this manner, the capacitor 54 forms an RC circuit with resistor 53, thereby creating a time constant at the positive input terminal 61 of comparator 52. The selected values of R7, R8, and C1 will be an obvious design choice to one skilled in the art.

Having described a first preferred embodiment, inventive aspects of the present invention will be better understood in conjunction with the following description of the operation of the current limiting circuit 20.

In particular, when the circuit 24 is initially connected to power bus 22 through the current limiting circuit 20, a voltage is created across gate terminal 36, and the MOSFET 26 is driven into its operating range, thereby turning ON the MOSFET 26. As a result, a current $I_s$ is created through resistor 44. At the same time, the power bus 22 supplies power to power terminals 45, 47 and 65 of op amps 46 and 48 and comparator 52, respectively, thereby activating each. As current begins to flow into circuit 24, the first op amp 46 amplifies and outputs the voltage across resistor 44 into the positive input terminal 49 of the second op amp 48. The output 39 of the second op amp 48 remains at ground until the voltage across the positive input terminal 49 of the second op amp 48 equals the voltage V1 at the negative input terminal 50 of the second op amp 48. When the voltage across the positive input terminal 49 of the second op amp 48 rises above the voltage V1, the second op amp 48 amplifies and outputs the voltage difference between the voltage at the output 43 of first op amp 46 and the voltage V1. As the current $I_s$ further increases, the voltage at the output 43 of the first op amp 46 increases, causing the voltage at the output 39 of the second op amp 48 to increase. As a result, the voltage at the gate terminal 36 of MOSFET 26 will increase, thereby decreasing the current through MOSFET 26, and decreasing the current flowing into circuit 24. In this manner, a feedback network that limits the current flowing into circuit 24 is formed.

During start-up, the RC circuit comprising the resistor 53 and capacitor 54, respectively, prevents the comparator 52 from providing feedback to the second op amp 48, which is reserved for periods when a true fault is occurring within circuit 24. In particular, as the load capacitance in circuit 24 is charging, capacitor 54 charges, thereby creating an increasing voltage at the positive input terminal 61 of comparator 52. Because the RC circuit will produce a time constant that is typically much longer than the period it takes to charge the load capacitance in circuit 24, the voltage at the positive input terminal 61 of comparator 52 will not rise above the voltage V2 at the negative input terminal 51 of comparator 52 during start-up. In this manner, an instantaneous voltage is prevented from appearing at the positive input terminal 61, falsely triggering a high voltage at the output 63 of comparator 52 during start-up.

During start-up, the current limiter 20 will act to limit current, as described hereinbefore, only for the time it takes to charge up the capacitors in circuit 24. In particular, after the capacitors in the circuit 24 are charged, (i.e., during normal operation of circuit 24) the current $I_s$ decreases lower than a level needed to maintain the voltage at the positive input terminal 49 of the second op amp 48 above the voltage V1 at the negative input terminal 50 of the second op amp 48. As a result, the second op amp 48 goes to ground, and thus, current limiter 20 ceases to provide feedback to MOSFET 26 and acts merely as resistance. In the event of a fault, however, the current limiter 20 will again limit the current flowing into circuit 24, as described above.

During a fault, the comparator 52 provides feedback to the second op amp 48, thus providing the current limiter 20 with an additional function. As the current limiter 20 begins limiting the current into circuit 24, the capacitor 54, will begin to charge, producing an increasing voltage at positive input terminal 61 of comparator 52. If the fault lasts long enough, the voltage across the positive input terminal 61 of comparator 52 will rise above the voltage V2 at the negative input terminal 51 of comparator 52, thereby producing a high voltage at the output 63 of comparator 52. In turn, the voltage at the output 63 of comparator 52 causes the voltage at the positive input terminal 49 of the second op amp 48 to remain above the voltage V1 at the negative input terminal 50, thereby producing a high voltage at the output 39. As a result, the MOSFET 26 will turn completely OFF. Since the second op amp 48 and the comparator 52 are powered directly from the power bus 22, the second op amp 48 and the comparator 52 remain operative and latched even when the MOSFET 26 is OFF. In this manner, the comparator 52 and the second op amp 48 will maintain the MOSFET 26 in an OFF state until the power bus 22 is cycled.

The RC circuit comprising the resistor 53 and capacitor 54 preferably produces a time constant that is much longer than the period that a transient load current typically lasts. As a result, the comparator 52 is not falsely triggered by load transients within the circuit 24.

The afore-described current limiting circuit 20 averts problems found in the prior current limiting circuits. The current limiting circuit 20 is extremely fast, limited mostly by the slew rate of the selected op amps. Response to faults has been measured in the circuit at approximately 10 $\mu$sec, which is fast enough that the power bus 22 will remain in regulation during such an event. Also, insertion bounce has no effect on the current limiting circuit 20, since the current limiting circuit 20 only remains latched on during faults. Further, the current limiting circuit 20 has a low resistance, and therefore, minimal power is dissipated within current limiting circuit 20. The current sensing resistor 44 of only a few ten's of m$\Omega$ may be preferably employed, and the MOSFET 26, while it is ON, has a small RDSon.

Moreover, the power dissipation within current limiting circuit 20 can be minimized by reducing these resistances. The current limiting circuit 20 needs no large components, since the comparator 52 ensures that the MOSFET 26 does not overheat during faults. The circuit 20 is, therefore, suitable for integration into an integrated circuit. Also, the amount of current limiting achieved by the current limiting circuit 20 can be relatively precisely set to any value. Since each component within the limiting circuit 20 is powered by the power bus 22, no additional power supplies are required to operate the limiting circuit 20.

Figure 2:
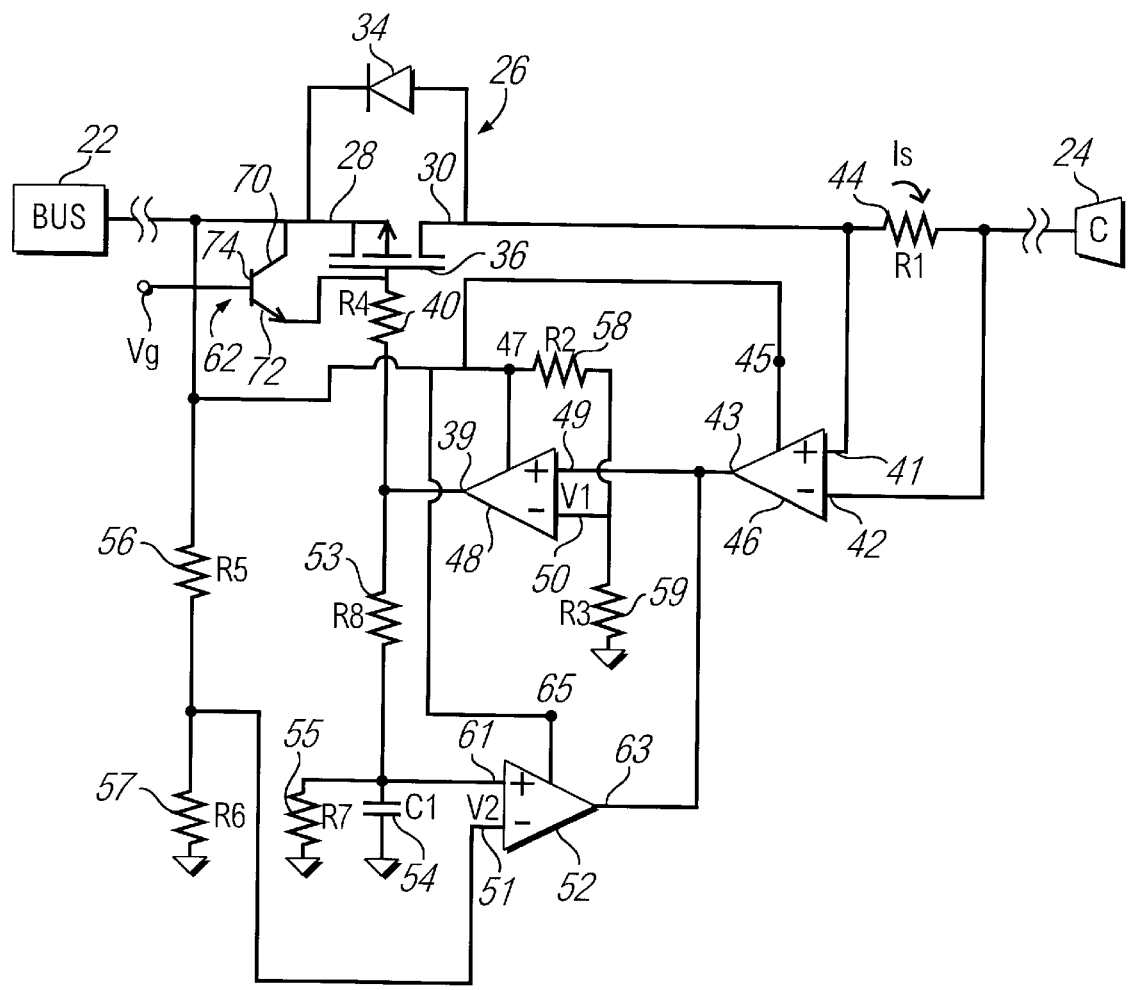
FIG. 2 is a schematic diagram of the preferred current limiting circuit of FIG. 1, further including an enable transistor.

Referring to FIG. 2, an enable, such as a BJT transistor 62 may be added to the preferred circuit 20. In this configuration, a collector terminal 70 of the transistor 62 is connected to the power bus 22, and an emitter terminal 72 is connected to gate terminal 36 of MOSFET 26, respectively. Thus, when the base 74 of transistor 62 is activated— e.g., by selective application of a voltage $V_g$, the voltage across the gate terminal 36 of MOSFET 26 is forced to equal the voltage of power bus 22, thereby turning MOSFET 26 OFF. The transistor 62 is otherwise non-conducting and thus has no power dissipation.

Figure 3:
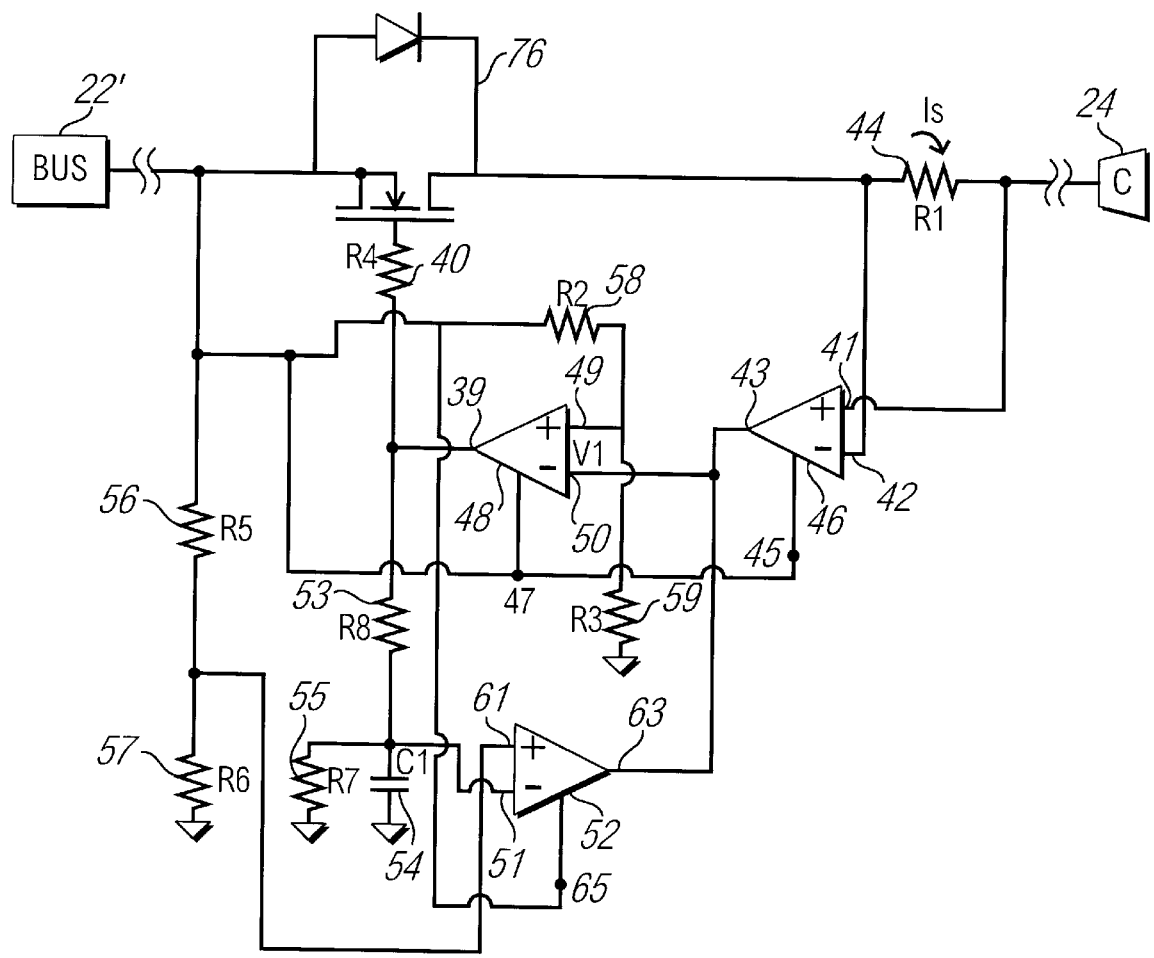
FIG. 3 is a schematic diagram of the preferred current limiting circuit of FIG. 1, configured for use in conjunction with a negative voltage power supply input bus.

Referring to FIG. 3, if the preferred circuit 20 were used in conjunction with a negative voltage power supply bus (designated as 22'), an N-channel MOSFET 76 is used in place of the P-channel MOSFET 26, and the respective input polarities of op amps 46 and 48, and of comparator 52, respectively, are reversed.

In particular, the positive input terminal 41 of the first op amp 46 is connected to the circuit 24 side, and the negative input terminal 42 is connected to the MOSFET 76 side, respectively, of resistor 44. Output 43 of the first op amp 46, and output 63 of the comparator 52 are connected to the negative input terminal 50, and power supply node 47 is connected to the positive input terminal 49, respectively, of the second op amp 48. Finally, output 39 of the second op amp 48 is connected to the negative input terminal 51, and the power supply bus 22' is connected to the positive input terminal 61, respectively, of comparator 52.

Thus, an improved apparatus and method for limiting current into a circuit during start-up and faults is disclosed. While embodiments and applications of this invention have been shown and described, it would be apparent to those skilled in the art that many more modifications are possible without departing from the inventive concepts herein.

By way of example, as will be apparent to those skilled in the art, two or more current limiting MOSFETs (i.e., instead of a single P-channel MOSFET 26 or N-channel MOSFET 76) can be arranged in parallel in circuits handling relatively high currents.

The invention, therefore is not to be restricted except in the spirit of the appended claims.

What is claimed:

1. A current limiting circuit for controlling the current between a power supply and a circuit to be protected, comprising:
   a MOSFET inserted between the power supply and the circuit to be protected, the MOSFET having a source terminal, a drain terminal and a gate terminal, wherein the source terminal of the MOSFET is connected to the power supply, and the drain terminal of the MOSFET is connected to the circuit to be protected;
   a current sensing resistor inserted along an electrical path connecting the drain terminal of the MOSFET to the circuit to be protected;
   a first operational amplifier configured to output a first voltage signal representing an amplified voltage measured across the current sensing resistor; and
   a second operational amplifier configured to output a second voltage signal representing an amplified voltage difference between the first voltage signal and a selected reference voltage, wherein the second voltage signal is applied to the gate terminal of the MOSFET.

2. The current limiting circuit of claim 1, wherein the power supply has a positive voltage.

3. The current limiting circuit of claim 2, wherein the MOSFET comprises an P-channel MOSFET.

4. The current limiting circuit of claim 2, wherein the first voltage signal is input into a positive input terminal, and the selected reference voltage is input into a negative input terminal, respectively, of the second operational amplifier.

5. The current limiting circuit of claim 1, wherein the first operational amplifier is powered off of the power supply.

6. The current limiting circuit of claim 1, wherein the second operational amplifier is powered off of the power supply.

7. The current limiting circuit of claim 1, further comprising a comparator, the comparator having a first input terminal connected to the MOSFET gate terminal and an RC circuit, a second input terminal connected to the power supply, and an output connected to the positive input terminal of the second operational amplifier, respectively.

8. The current limiting circuit of claim 7, wherein the comparator is powered off of the power supply.

9. The current limiting circuit of claim 7, wherein the comparator is configured to output a high voltage into the second operational amplifier whenever a transient voltage across the RC circuit rises above a second reference voltage.

10. The current limiting circuit of claim 1, wherein the power supply has a negative voltage.

11. The current limiting circuit of claim 10, wherein the MOSFET comprises an N-channel MOSFET.

12. The current limiting circuit of claim 1, further comprising an enable placed between the power bus and the gate terminal of the MOSFET, respectively, such that the MOSFET can be turned OFF by inputting a signal into the enable.

13. The current limiting circuit of claim 12, wherein the enable comprises a BJT transistor.

14. A current limiting circuit for controlling the current between a power supply having a positive voltage and a circuit to be protected, comprising:
   a P-channel MOSFET inserted between the power supply and the circuit to be protected, the MOSFET having a source terminal, a drain terminal and a gate terminal, wherein the source terminal of the MOSFET is connected to the power supply, and the drain terminal of the MOSFET is connected to the circuit to be protected;
   a current sensing resistor inserted along an electrical path connecting the drain terminal of the MOSFET to the circuit to be protected;
   a first operational amplifier configured to output a first voltage signal representing an amplified voltage measured across the current sensing resistor; and
   a second operational amplifier configured to output a second voltage signal representing an amplified voltage difference between the first voltage signal and a selected reference voltage, wherein the second voltage signal is applied to the gate terminal of the MOSFET and
   wherein the first and second operational amplifiers are powered off of the power supply.

15. The current limiting circuit of claim 14, wherein the first voltage signal is input into a positive input terminal, and the selected reference voltage is input into a negative input terminal, respectively, of the second operational amplifier.

16. The current limiting circuit of claim 14, further comprising a comparator, the comparator having a first input terminal connected to the MOSFET gate terminal and an RC circuit, a second input terminal connected to the power supply, and an output connected to the positive input terminal of the second operational amplifier, respectively, wherein the comparator is powered off of the power supply.

17. The current limiting circuit of claim 14, further comprising an enable placed between the power bus and the gate terminal of the MOSFET, respectively, such that the MOSFET can be turned OFF by inputting a signal into the enable.

18. A current limiting circuit for controlling the current between a power supply having a negative voltage and a circuit to be protected, comprising:
   a MOSFET inserted between the power supply and the circuit to be protected, the MOSFET having a source terminal, a drain terminal and a gate terminal, wherein the source terminal of the MOSFET is connected to the power supply, and the drain terminal of the MOSFET is connected to the circuit to be protected;
   a current sensing resistor inserted along an electrical path connecting the drain terminal of the MOSFET to the circuit to be protected;
   a first operational amplifier configured to output a first voltage signal representing an amplified voltage measured across the current sensing resistor;
   a second operational amplifier configured to output a second voltage signal representing an amplified voltage difference between the first voltage signal and a selected reference voltage, wherein the second voltage signal is applied to the gate terminal of the MOSFET; and
   a comparator having a first input terminal connected to the MOSFET gate terminal and an RC circuit, a second input terminal connected to the power supply, and an output connected to the negative input terminal of the second operational amplifier, respectively.

19. The current limiting circuit of claim 18, wherein the MOSFET comprises an N-channel MOSFET.

20. The current limiting circuit of claim 18, wherein the first and second operational amplifiers are powered off of the power supply.

* * * * *